(12) United States Patent
Danz et al.

(10) Patent No.: US 7,046,436 B2
(45) Date of Patent: May 16, 2006

(54) ARRANGEMENT AND METHOD FOR POLARIZATION-OPTICAL INTERFERENCE CONTRAST

(75) Inventors: Rainer Danz, Goettingen (DE); Peter Dietrich, Oberkochen (DE); Alexander Soell, Waake (DE); Carsten Hoyer, Juehnde (DE); Michael Wagener, Goettingen (DE)

(73) Assignee: Carl Zeiss Jena GmbH, Jena (DE)

( * ) Notice: Subject to any disclaimer, the term of this patent is extended or adjusted under 35 U.S.C. 154(b) by 2 days.

(21) Appl. No.: 10/425,303

(22) Filed: Apr. 29, 2003

(65) Prior Publication Data

US 2004/0017609 A1    Jan. 29, 2004

(30) Foreign Application Priority Data

Apr. 30, 2002   (DE) ................................. 102 19 804

(51) Int. Cl.
*G02B 21/14* (2006.01)

(52) U.S. Cl. ........................ 359/371; 359/370; 359/386
(58) Field of Classification Search ................ 359/386, 359/385, 371, 370, 387
See application file for complete search history.

(56) References Cited

U.S. PATENT DOCUMENTS

| 2,785,601 | A |   | 3/1957 | Francon |
|---|---|---|---|---|
| 2,924,142 | A | * | 2/1960 | Nomarski .................... 359/371 |
| 2,977,847 | A | * | 4/1961 | Meyer-Arendt ............. 359/370 |
| 3,495,890 | A |   | 2/1970 | Pluta |
| 3,658,405 | A | * | 4/1972 | Pluta ........................... 359/371 |
| 3,930,732 | A | * | 1/1976 | Holly ....................... 356/124.5 |
| 4,255,014 | A |   | 3/1981 | Ellis |
| 6,229,644 | B1 |   | 5/2001 | Kusaka |

FOREIGN PATENT DOCUMENTS

| DE | 100 04 135 |   | 8/2000 |
|---|---|---|---|
| EP | 0 634 682 A2 |   | 1/1995 |
| FR | 1059123 |   | 3/1954 |
| GB | 639014 | * | 6/1950 |
| GB | 1 282 087 |   | 7/1972 |
| GB | 2059101 A | * | 4/1981 |
| WO | WO 9906807 A1 | * | 2/1999 |

\* cited by examiner

Primary Examiner—Drew A. Dunn
Assistant Examiner—Mark Consilvio
(74) Attorney, Agent, or Firm—Reed Smith LLP

(57) ABSTRACT

The invention is directed to a method of differential interference contrast in which the object is illuminated by natural light and the light coming from the object is first polarized after passing through the objective. The observation is carried out with a shearing interferometer which is known per se.

7 Claims, 1 Drawing Sheet

ARRANGEMENT AND METHOD FOR POLARIZATION-OPTICAL INTERFERENCE CONTRAST

CROSS-REFERENCE TO RELATED APPLICATIONS

This application claims German Application No. 102 19 804.7, filed Apr. 30, 2002, the complete disclosure of which is hereby incorporated by reference.

BACKGROUND OF THE INVENTION a) Field of the Invention

The invention is directed to an arrangement and a method for polarization-optical interference contrast.

b) Description of the Related Art

It is applicable in particular to high-contrast microscope display of phase objects such as cell cultures arranged on any (optically isotropic or anisotropic) substrate materials by means of differential interference contrast (DIC).

Objects to be examined by microscope can be distinguished as amplitude objects and phase objects. While amplitude objects change the brightness or color of the light used for display and can therefore be made directly visible, phase objects only change the phase position of the light, e.g., by diverging from the surroundings with respect to refractive index or thickness. Since neither the human eye nor electronic image converters can detect changes in phase position, additional steps must be taken to display phase objects in order to translate phase changes into amplitude changes.

Different methods distinguished as phase contrast methods and interference contrast methods have been developed for this purpose.

One of the first interference contrast methods was proposed in 1947 by Francis Smith in British Patent GB 639 014. For this purpose, a Wollaston prism is introduced into the focal plane of the condenser and into the focal plane of the objective in the beam path of the microscope. A polarizer is arranged in the beam path in front of the first Wollaston prism for generating linearly polarized light. After passing through the second Wollaston prism, the light is analyzed (analyzer) by means of a second polarizer. The illumination-side Wollaston prism has the task of compensating the pupil path difference generated by the Wollaston prism on the imaging side, making it possible to work with the full illumination aperture.

This method was further developed in 1952 by Georges Nomarski in French Patent FR 1 059 123. In this case, the spatial orientation of the Wollaston prisms is modified so that splitting and recombination of the ordinary and extraordinary beam can be relocated to a plane outside of the prism, so that a better possibility for the arrangement of the optical elements is achieved.

In 1963, Maximilian Pluta proposed (U.S. Pat. No. 3,495, 890) replacing the Wollaston prism on the imaging side by two Wollaston prisms arranged one behind the other, so that the image splitting size could be changed discretely in three steps.

The DIC microscope recently suggested by Kenichi Kusaka in U.S. Pat. No. 6,229,644 also has an analogous construction.

All of these solutions have in common that the illumination of the object must be carried out with polarized light. Accordingly, the objective as well as all optical elements in the illumination beam path must have an isotropic character. Optical anisotropism in these elements would substantially interfere with the image character of the intermediate image. In particular, no object carriers made of plastic can be used because this would have a birefringent effect. This rules out the plastic petri dishes used as object carriers for cell cultures. For purposes of analysis, the cell cultures must be arranged on conventional cover slips, which requires additional preparation time and costs and precludes examination of live cultures.

In order to eliminate these disadvantages, it is suggested in DE-OS 100 04 135 to use special petri dishes with defined optical characteristics. However, the manufacture of these petri dishes and selection of usable materials are costly.

OBJECT AND SUMMARY OF THE INVENTION

Therefore, it is the primary object of the invention to overcome the disadvantages of the prior art and to indicate a polarization-optical contrast method in which optically anisotropic substrate materials and objectives or condensers subject to residual stresses can be used for the object to be examined by microscope.

According to the invention, this object is met by a method for polarization-optical interference contrast for microscope imaging of an object comprising the steps of illuminating the object with natural (non-polarized) light, converting the light passing through the object into linearly polarized light, splitting of the linearly polarized light into an ordinary beam and an extraordinary beam, allowing interference of the ordinary beam and extraordinary beam, filtering out the identically polarized light and imaging of the interferogram formed in this manner.

The features of an arrangement, according to the invention, for polarization-optical interference contrast in a microscope comprises a light source which images light onto an object by a condenser and an objective is provided through which light passing through the object is imaged in an objective exit pupil, the objective being followed by a first polarizer which linearly polarizes the light coming from the objective. A shearing interferometer is included which is arranged after the first polarizer in the vicinity of the objective exit pupil. A second polarizer is provided after the interferometer. Accordingly, in contrast to the known methods, the illumination of the object arranged on the object substrate is carried out according to the invention with natural, non-polarized light. Anisotropism (e.g., birefringence caused by residual stresses) in object substrates or objectives and condensers do not come into play. The light is first linearly polarized after passing through the objective and is supplied to a shearing interferometer. Coherent components of light which oscillate in the same azimuth are filtered out by a second polarizer which serves as an analyzer, so that a visible interferogram is formed. It is advantageous when the width of the gap or slit is adjustable. It is particularly advantageous when the slit width b satisfies the following condition:

$$\frac{bB}{f} < \frac{\lambda}{4} \qquad (1)$$

where B is the shear size related to the object plane, f is the focal length of the condenser and $\lambda$ is the light wavelength. Violation of this condition leads to a worsening of the contrast.

When monochromatic light is used, the slit can also be advantageously replaced by several parallel illumination slits whose distances d should satisfy the following condition:

$$\frac{dB}{f} = \lambda \quad (2)$$

This arrangement of the illumination slit can also be realized as a grating with a grating constant d.

A Smith type or Nomarski type Wollaston prism or a Jamin-Lebedeff interferometer can also advantageously be used as a shearing interferometer.

The invention is realized in an advantageous manner when at least one of the polarizers is adjustable with respect to its polarization direction. Particularly good results are achieved when the polarization devices of the two polarizers are at an angle of 90° relative to one another.

Another advantageous construction of the invention consists in that the combined polarizer, shearing interferometer and analyzer can carry out synchronous azimuthal rotation with the illumination slit or illumination slits of the grating, so that all structures in the preparation which lie in different azimuths and which would disappear because of the azimuth effect can be contrasted one after the other. Therefore, the rotation of the table or stage which would otherwise be necessary is dispensed with.

In the following, the invention will be explained in more detail with reference to the drawings.

DESCRIPTION OF THE PREFERRED EMBODIMENTS

Figure 1:
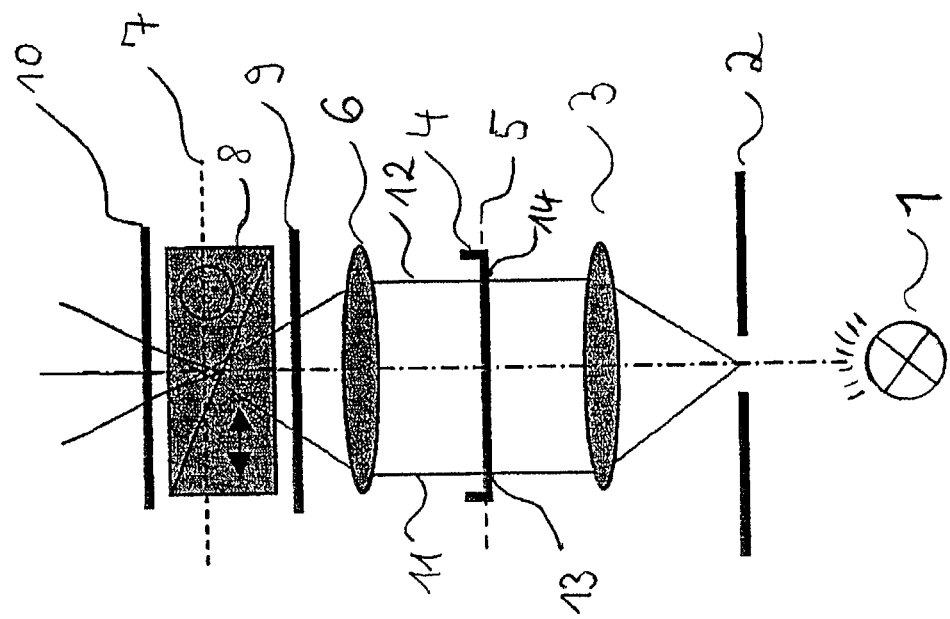
FIG. 1 shows a schematic view of the beam path.

In FIG. 1, the light of a lamp 1 is imaged, via a slit 2 and a condenser 3, on the object, e.g., a cell culture, in a petri dish 4. The object plane 5 is imaged by an objective 6 in the intermediate image plane 7. A Wollaston prism 8 which is embedded between crossed polars 9 and 10 is arranged at this location of the intermediate image plane 7.

The ordinary beam 11 and the extraordinary beam 12 penetrate the examined object at different points 13, 14. The distance between the points 13 and 14 is the split or shear, as it is called, which is shown in FIG. 1 in exaggerated size for purposes of illustration.

Figure 2:
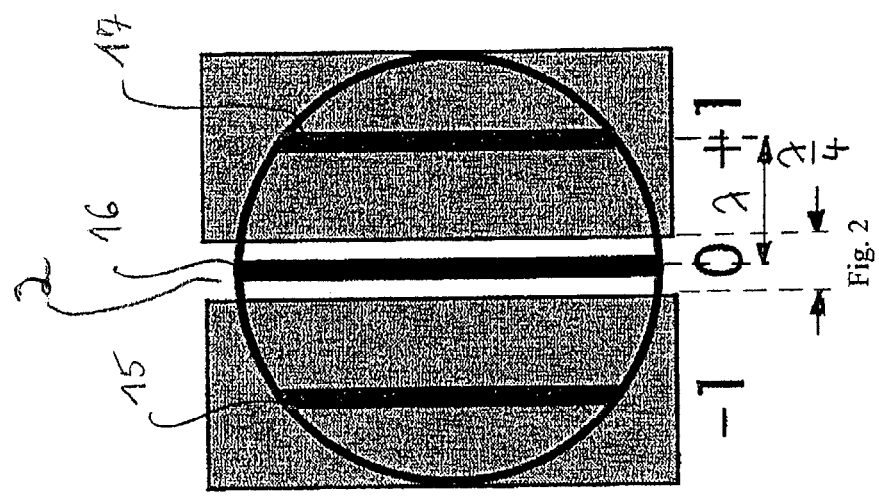
FIG. 2 shows a schematic view of the size ratios at the illumination slit.

FIG. 2 schematically shows the back projection of the interference fringes 15, 16, 17 occurring in the intermediate image plane 7 in the plane of the slit 2. For the method according to the invention, the width of the slit 2 is to be selected in such a way that the effective pupil path difference in the direction of the slit width is less than or equal to a quarter wavelength or less than or equal to a quarter of the interference fringe distance in the pupil, advantageously proceeding from the zeroth interference order.

Under this condition, the field contrast following a sinc function according to Michelson is never less than 0.64. This is expressed mathematically in formula (1).

When monochromatic light is used instead of white light, the illumination slit can be replaced by a plurality of illumination slits, each individual slit satisfying the quarter wave condition. This condition is expressed by formula (2).

The realization of the invention is not limited to the embodiment example shown herein. Further developments by persons skilled in the art do not constitute a departure from the field of the invention. Accordingly, the slit or the grating between the light source and condenser can also be replaced by a differently shaped, e.g., circular, diaphragm, although this would result in worsened contrast While the foregoing description and drawings represent the present invention, it will be obvious to those skilled in the art that various changes may be made therein without departing from the true spirit and scope of the present invention.

What is claimed is:

1. An arrangement for polarization-optical interference contrast in a microscope comprising:
    a light source which images light onto an object by a condenser;
    an objective being provided through which light passing through the object is imaged in an objective exit pupil;
    said objective being followed by a first polarizer which linearly polarizes the light coming from the objective;
    a shearing interferometer being arranged after the first polarizer in the vicinity of the objective exit pupil; and
    a second polarizer being provided after the interferometer,
    wherein a Jamin-Lebedeff interferometer or a Smith type or Nomarski type Wollaston prism is provided as the shearing interferometer
    wherein a slit is arranged between the light source and the condenser
    and the width of the slit is adjustable
    and the width b of the slit satisfies the following condition:

$$\frac{bB}{f} < \frac{\lambda}{4}$$

where B is the shear size related to the object plane, f is the focal length of the condenser and λ is the light wavelength.

2. The arrangement for polarization-optical interference contrast according to claim 1, wherein the polarization direction of at least one of the polarizers is adjustable.

3. The arrangement for polarization-optical interference contrast according to claim 1, wherein the first polarizer and second polarizer have polarization directions inclined at an angle of 90° relative to one another.

4. The arrangement for polarization-optical interference contrast according to claim 1, wherein the slit is rotatable about the optical axis of the condenser.

5. An arrangement for polarization-optical interference contrast in a microscope comprising:
    a light source which images light onto an object by a condenser;
    an objective being provided through which light passing through the object is imaged in an objective exit pupil;
    said objective being followed by a first polarizer which linearly polarizes the light coming from the objective;
    a shearing interferometer being arranged after the first polarizer in the vicinity of the objective exit pupil; and
    a second polarizer being provided after the interferometer,
    wherein a Jamin-Lebedeff interferometer or a Smith type or Nomarski type Wollaston prism is provided as the shearing interferometer, and a grating is arranged between the light source and the condenser, wherein the grating constant d of the grating satisfies the formula $$\frac{dB}{f} = \lambda$$

where B is the shear size related to the object plane, f is the focal length of the condenser and $\lambda$ is the light wavelength.

6. The arrangement for polarization-optical interference contrast according to claim 5, wherein the grating is rotatable about the optical axis of the condenser.

7. The arrangement for polarization-optical interference contrast according to claim 6, wherein a device is provided by which the combined polarizer, shearing interferometer and analyzer can carry out synchronous azimuthal rotation with the illumination slit or with the grating.

* * * * *